No. 888,276. PATENTED MAY 19, 1908.
J. G. VENABLE, Sr.
SPRING BED BOTTOM.
APPLICATION FILED MAY 18, 1907.
2 SHEETS—SHEET 1.
Fig. 1.
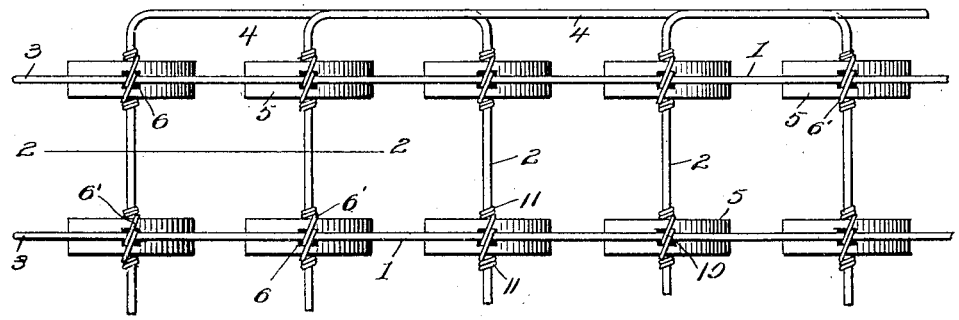
Fig. 2.
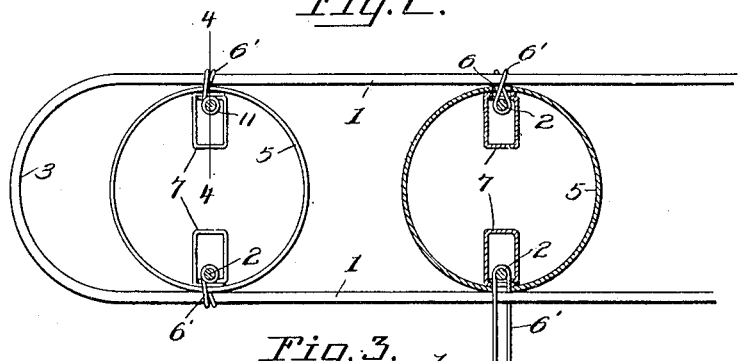
Fig. 3.
Fig. 4.
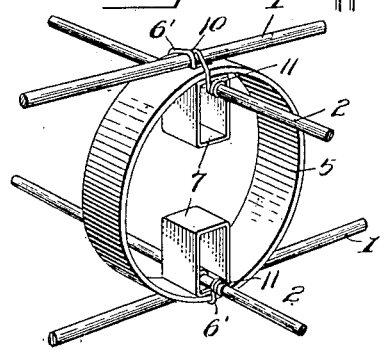
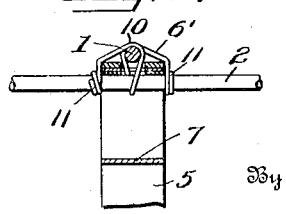
Witnesses
F. C. Gibson
C. Bradway
Inventor
Joseph G. Venable, Sr.
By Victor J. Evans
Attorney

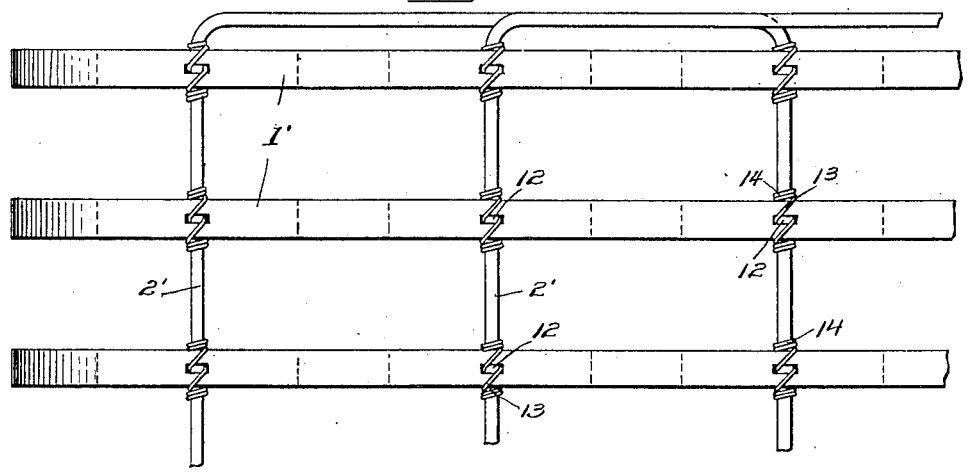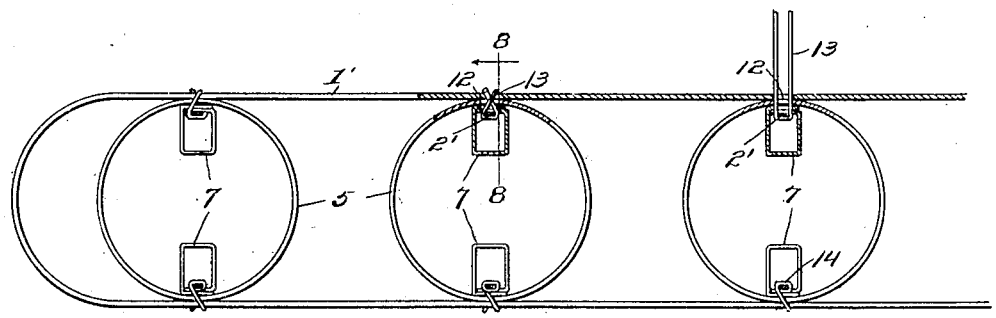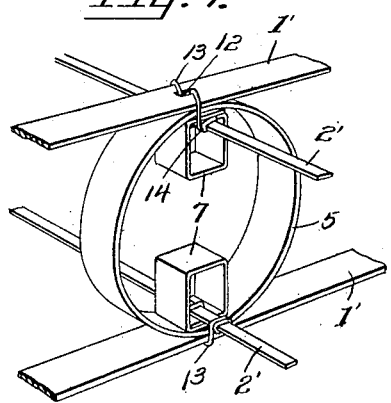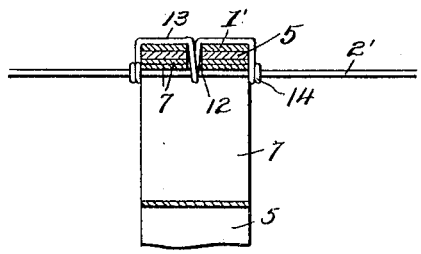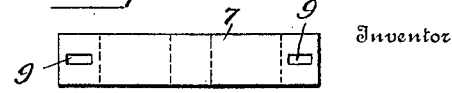

UNITED STATES PATENT OFFICE.

JOSEPH G. VENABLE, SR., OF MAHOMET, ILLINOIS.

SPRING BED-BOTTOM.

No. 888,276.    Specification of Letters Patent.    Patented May 19, 1908.

Application filed May 18, 1907. Serial No. 374,318.

*To all whom it may concern:*

Be it known that I, JOSEPH G. VENABLE, Sr., a citizen of the United States, residing at Mahomet, in the county of Champaign and State of Illinois, have invented new and useful Improvements in Spring Bed-Bottoms, of which the following is a specification.

This invention relates to spring bed bottoms of that type provided with top and bottom longitudinal and cross members with resilient elements or circular springs disposed between them.

The invention has for one of its objects to improve and simplify the construction and operation of devices of this character so as to be comparatively easy and inexpensive to manufacture, of durable design, and composed of few parts.

A further object of the invention is the provision of stop devices or bumpers for limiting the compression of the circular springs so as to prevent breakage thereof under excessive weight.

A still further object is the provision of a simple and effective means for securing the longitudinal and cross members and spring elements together and at the same time securing the bumpers in position.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate certain of the embodiments of the invention, Figure 1 is a plan view of one portion of a bed bottom. Fig. 2 is a vertical section on line 2—2, Fig. 1, drawn on an enlarged scale. Fig. 3 is a perspective view of one of the circular springs with the bumpers applied thereto. Fig. 4 is a detail sectional view on line 4—4, Fig. 2. Fig. 5 is a fragmentary plan view of a modified form of bed bottom. Fig. 6 is a longitudinal section thereof. Fig. 7 is a perspective view of one of the circular springs and adjacent parts. Fig. 8 is a vertical section on line 8—8, Fig. 6, drawn on an enlarged scale. Fig. 9 is a plan view of one of the blanks from which the stops or bumpers are made.

Similar reference characters are employed to designate corresponding parts throughout the several views.

Referring to Figs. 1 to 4, the body of the bed bottom comprises a metallic framework composed of top and bottom longitudinal and transverse members 1 and 2 which, in the present instance, are made of spring wire stock of suitable gage. The corresponding top and bottom longitudinal members 1 are preferably a single length of wire and are connected at their ends by the semi-circular bends 3, while the cross members 2 are arranged in pairs and each pair is connected by a horizontal connection portion 4, as shown in Fig. 1. Between the top and bottom members are disposed circular springs 5 arranged at the points of crossing of the members. These rings are provided with openings 6 at diametrically opposite points for receiving tie wires 6, whereby the parts can be bound together. The cross members 2 are preferably disposed between the corresponding members 1 and extend through the springs 5. Arranged within each spring are oppositely disposed bumpers or stops 7 that limit the compression of the springs so that breakage of the latter is effectively prevented. Each device 7 comprises a strip of metal bent into rectangular form with overlapping ends, which latter are perforated as indicated at 9 in Fig. 9, for the purpose of receiving the tie wires.

As shown in the right lower corner of Fig. 2, the tie wires are of U-shaped form and are straddled over cross members 2, and through the apertures 9 of the device 7 and openings 6 of the springs, and then crossed once over the members 1, as indicated at 10, Fig. 3, so that their extremities can be brought downwardly on opposite sides of the springs and coiled around and anchored on the members 2, as indicated at 11. By this means, the members constituting the body of the bed bottom and springs and bumpers are secured together by a single device, and in such manner that the bed bottom can be quickly and readily constructed or repaired when occasion requires.

In the modification shown in Figs. 5 to 8, inclusive, the longitudinal and transverse members 1′ and 2′ are constructed of strip metal instead of being round in cross section, as shown in Fig. 1. The longitudinal members 1 are provided with apertures 12 for receiving the tie wires 13, and these wires are straddled over the members 2′ and through the apertures 9 of the bumpers 7, and openings 12 of the longitudinal members, as shown at the right of Fig. 6. The ends of the tie wire are then bent transversely over the longitudinal member 1, as indicated in Fig. 8, and thence downwardly along the sides of the longitudinal member, spring 5' and bumper 7, so as to be coiled at 14 around the cross member 2'.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired, as are within the scope of the claims.

Having thus described the invention, what I claim is:—

1. A spring bed bottom comprising top and bottom longitudinal and transverse cross members, circular springs disposed between them and having diametrically disposed apertures, stop devices or bumpers arranged within each spring for limiting the compression thereof and consisting of metal strips having apertured ends overlapping and disposed against the members, and tie wires extending through the apertures of the springs and devices and arranged to bind the devices to the said members.

2. A spring bed bottom comprising top and bottom longitudinal and transverse members, circular springs having diametrically disposed openings, bumpers arranged at the openings and within the springs and having portions disposed between the members where they cross, and tie wires for binding the members together at the points where they cross, and passing through the apertures of the springs for securing the latter and bumpers to the members and preventing lateral movement of the bumpers.

3. In a spring bed bottom, the combination of a resilient element, cross members disposed one within and one without the element, a bumper consisting of a strip of metal having its ends disposed between the internal member and element, and a tie wire for securing all of said parts together.

4. In a spring bed bottom, the combination of an annular resilient element having an aperture, cross members one extending within and the other without the element at the aperture thereof, a strip of metal forming a bumper having apertured ends overlapping and disposed between the internal member and element at the aperture thereof, a tie wire straddling the internal member and passing through the apertures of the bumper and element and passing over the outer member and having its ends fastened to the inner member.

5. A spring bed bottom comprising top and bottom longitudinal and transverse members, endless springs disposed between the top and bottom members, a pair of hollow oppositely disposed bumpers arranged within each spring, and a fastening wire securing each bumper in fixed relation to the adjacent ring and also securing it to both members and holding the members together.

6. In a spring bed bottom, the combination of an endless resilient element having apertures at diametrically opposite points, crossed members arranged at diametrically opposite points and adjacent the apertures, hollow bumpers disposed within the element and through each of which a member extends, and a binding wire securing the bumpers and elements together and also to the cross members.

In testimony whereof, I affix my signature in presence of two witnesses.

JOSEPH G. VENABLE, Sr.

Witnesses:
A. R. SCOTT,
T. W. REA.